US012766463B2

(12) United States Patent
Yang

(10) Patent No.: US 12,766,463 B2
(45) Date of Patent: Oct. 20, 2026

(54) SYSTEM FOR SUPPLYING HYDROGEN AND METHOD FOR CONTROLLING THE SAME

(71) Applicants: Hyundai Motor Company, Seoul (KR); Kia Corporation, Seoul (KR)

(72) Inventor: Seung Ki Yang, Yongin-si (KR)

(73) Assignees: Hyundai Motor Company (KR); Kia Corporation (KR)

( * ) Notice: Subject to any disclaimer, the term of this patent is extended or adjusted under 35 U.S.C. 154(b) by 1023 days.

(21) Appl. No.: 17/979,211

(22) Filed: Nov. 2, 2022

(65) Prior Publication Data

US 2023/0352711 A1 Nov. 2, 2023

(30) Foreign Application Priority Data

May 2, 2022 (KR) ........................ 10-2022-0054402

(51) Int. Cl.
*B01D 53/32* (2006.01)

(52) U.S. Cl.
CPC .................................. *B01D 53/326* (2013.01)

(58) Field of Classification Search
CPC ............ C25B 1/02; C25B 1/04; B01D 53/326
See application file for complete search history.

(56) References Cited

U.S. PATENT DOCUMENTS

| | | | |
|---|---|---|---|
| 11,192,064 B2 | 12/2021 | Zhang et al. | |
| 2019/0311890 A1 | 10/2019 | Yakumaru et al. | |
| 2019/0316603 A1 | 10/2019 | Zhang et al. | |
| 2019/0368483 A1 | 12/2019 | Wakita et al. | |
| 2022/0290311 A1* | 9/2022 | Ono | C25B 1/04 |

FOREIGN PATENT DOCUMENTS

| | | | | |
|---|---|---|---|---|
| CN | 111668515 A | | 9/2020 | |
| CN | 113994028 A | * | 1/2022 | H01M 8/0687 |
| JP | 2006019121 A | | 1/2006 | |
| JP | 2010282783 A | | 12/2010 | |
| JP | 2018199852 A | | 12/2018 | |
| JP | 2019183258 A | | 10/2019 | |
| JP | 2020037724 A | | 3/2020 | |
| KR | 101713494 B1 | | 3/2017 | |

* cited by examiner

*Primary Examiner* — Ciel P Contreras
(74) *Attorney, Agent, or Firm* — Fish & Richardson P.C.

(57) ABSTRACT

The present disclosure relates to a system for supplying hydrogen and a method for controlling the same. The system includes a hydrogen compressor for electrochemically compressing the hydrogen, and a controller that preliminarily drives the hydrogen compressor, estimates an amount of hydrogen transferred via a membrane electrode assembly interposed between an anode separator and a cathode separator in a cell of the hydrogen compressor in a period of the preliminary driving, and performs initialization driving to reduce moisture on a side of the anode separator of the cell based on the transferred amount of hydrogen being smaller than a threshold value.

20 Claims, 9 Drawing Sheets

SYSTEM FOR SUPPLYING HYDROGEN AND METHOD FOR CONTROLLING THE SAME

CROSS-REFERENCE TO RELATED APPLICATION

This application claims the benefit of priority to Korean Patent Application No. 10-2022-0054402, filed on May 2, 2022, the entire contents of which are incorporated herein by reference.

TECHNICAL FIELD

The present disclosure relates to a system for supplying hydrogen and a method for controlling the same, and more particularly, relates to a system for supplying hydrogen and a method for controlling the same that may smoothly maintain hydrogen supply to a hydrogen compressor.

BACKGROUND

A hydrogen fueled vehicle is designed to travel by generating its own electricity via a chemical reaction between hydrogen and oxygen and driving a motor. The hydrogen fueled vehicle generally includes a hydrogen tank ($H_2$ tank) where the hydrogen ($H_2$) is stored, a stack (such as a fuel cell (FC) stack) that produces the electricity via a redox reaction of the hydrogen and the oxygen (O2), various apparatuses for draining generated water, a battery that stores the electricity produced by the stack, a controller that converts and controls the generated electricity, a motor that generates a driving force, and the like.

A fuel cell that produces the electricity generally receives the hydrogen from a hydrogen charger. A system for supplying the hydrogen to the fuel cell may include a hydrogen compressor that compresses the hydrogen and a hydrogen storage tank that stores the compressed hydrogen.

The hydrogen compressor may compress the hydrogen via an electrochemical method, and may include an anode, an electrolyte membrane, and a cathode for this purpose. The hydrogen supplied to the anode is separated into hydrogen ions and electrons by an oxidation reaction, and the hydrogen ions move to the cathode via the electrolyte membrane. The hydrogen ions moved to the cathode become hydrogen molecules via a reduction reaction. Because an interior of the hydrogen compressor maintains a considerably high pressure, it is very important to maintain airtightness to prevent damage to internal components caused by the high pressure. For maintaining the airtightness, the hydrogen compressor may use a diffusion layer using a metal. Because the metal diffusion layer has a hydrophilic characteristic, water molecules may be injected into the metal diffusion layer and block a movement path of the hydrogen.

SUMMARY

The present disclosure has been made to solve the above-mentioned problems occurring in the prior art while advantages achieved by the prior art are maintained intact.

An aspect of the present disclosure provides a system for supplying hydrogen and a method for controlling the same that may smoothly maintain a hydrogen flow inside a hydrogen compressor.

Another aspect of the present disclosure provides a system for supplying hydrogen and a method for controlling the same that may effectively remove moisture that interferes with a hydrogen flow inside a hydrogen compressor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for supplying hydrogen includes a hydrogen compressor for electrochemically compressing the hydrogen, and a controller that preliminarily drives the hydrogen compressor, estimates an amount of hydrogen transferred via a membrane electrode assembly interposed between an anode separator and a cathode separator in a cell of the hydrogen compressor in a period of the preliminary driving, and performs initialization driving to reduce moisture on a side of the anode separator of the cell based on the transferred amount of hydrogen being smaller than a threshold value.

In one implementation, the system may further include a power supply for applying a reference voltage to the anode separator and the cathode separator of the cell in the preliminary driving period under control of the controller.

In one implementation, the controller may calculate a current density of the membrane electrode assembly by applying the reference voltage to the cell of the hydrogen compressor, and estimate a magnitude of the transferred amount of hydrogen in proportion to the current density.

In one implementation, the controller may calculate the current density by calculating an output current amount of the power supply for each unit area of the membrane electrode assembly.

In one implementation, the controller may control an additional apparatus for increasing a temperature inside the hydrogen compressor.

In one implementation, the controller may control a power supply to apply a high voltage higher than a reference voltage to the anode separator or the cathode separator.

In one implementation, the controller may apply a voltage of a gradually increasing voltage level to the anode separator and the cathode separator, calculate a current density at each voltage level, and identify a target voltage of inducing the current density to reach a preset target value.

In one implementation, the controller may drive the cell while lowering the target voltage to a magnitude of the reference voltage, and perform the initialization driving until the current density obtained in a reference voltage-applied period becomes equal to or greater than the target value.

In one implementation, the system may further include a hydrogen purifier for purifying hydrogen discharged from the hydrogen compressor, and the controller may control a flow path of the hydrogen purifier to provide hydrogen discharged from the hydrogen purifier to the hydrogen compressor.

In one implementation, the system may further include a hydrogen purifier for purifying hydrogen discharged from the hydrogen compressor, and the controller may increase a temperature in the cell while increasing a voltage level from a reference voltage preset to the anode separator or the cathode separator to a preset limit voltage, and provide dry hydrogen discharged from the hydrogen purifier to the side of the anode separator when a current density at a threshold voltage is smaller than the threshold value.

According to another aspect of the present disclosure, a method for controlling a hydrogen supply system includes preliminarily driving a hydrogen compressor using a reference voltage, estimating an amount of hydrogen transferred via a membrane electrode assembly in a cell of the hydrogen compressor in a period of the preliminary driving, and performing initialization driving to reduce moisture on a side of an anode separator of the cell based on the transferred amount of hydrogen being smaller than a threshold value.

In one implementation, the preliminary driving of the hydrogen compressor may include applying the reference voltage to the anode separator and a cathode separator of the cell using a power supply.

In one implementation, the estimating of the transferred amount of hydrogen may include applying the reference voltage to the cell of the hydrogen compressor, calculating a current density of the membrane electrode assembly, and estimating a magnitude of the transferred amount of hydrogen in proportion to the current density.

In one implementation, the calculating of the current density of the membrane electrode assembly may include calculating the current density with an output current amount of the power supply for each unit area of the membrane electrode assembly.

In one implementation, the performing of the initialization driving may include increasing a temperature inside the hydrogen compressor.

In one implementation, the performing of the initialization driving may include applying a high voltage higher than the reference voltage to the anode separator or a cathode separator using a power supply.

In one implementation, the performing of the initialization driving may include applying a voltage of a gradually increasing voltage level to the anode separator and the cathode separator, calculating a current density at each voltage level, and identifying a target voltage of inducing the current density to reach a preset target value.

In one implementation, the performing of the initialization driving may include driving the cell while lowering the target voltage to a magnitude of the reference voltage, and performing the initialization driving until the current density obtained in a reference voltage-applied period reaches the target value.

In one implementation, the performing of the initialization driving may include providing dry hydrogen to a side of the anode separator.

In one implementation, the performing of the initialization driving may include increasing a temperature in the cell while increasing a voltage level from the reference voltage preset to the anode separator or a cathode separator to a preset limit voltage, and providing dry hydrogen to the side of the anode separator when a current density at the limit voltage is smaller than the threshold value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
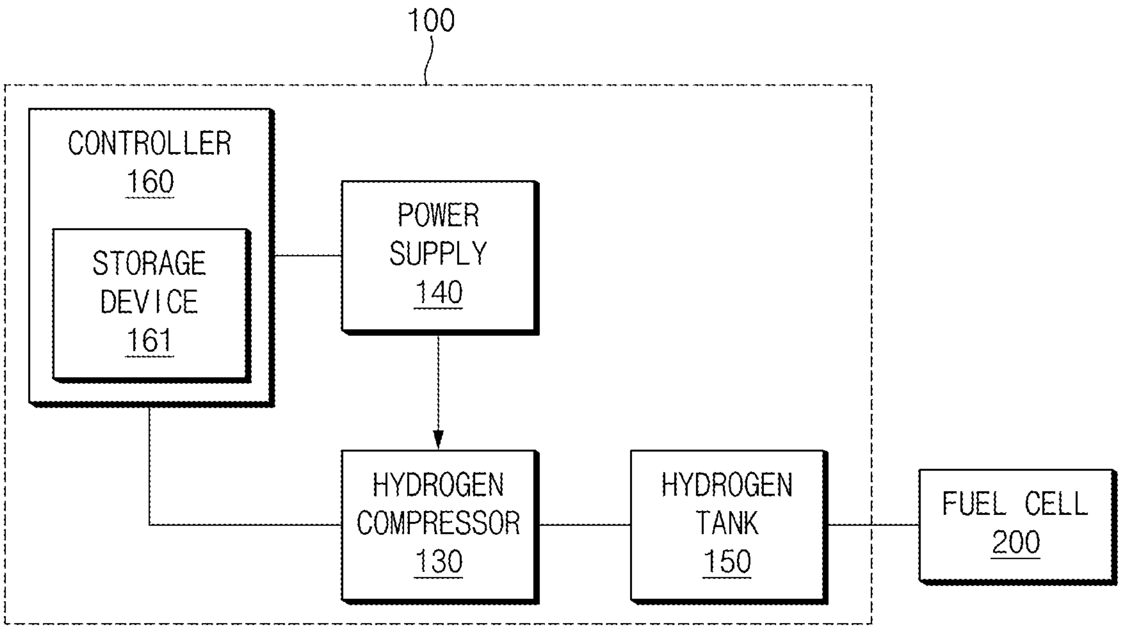
FIG. 1 is a view showing a hydrogen supply system according to an example of the present disclosure.

Hereinafter, exemplary implementations of the present disclosure will be described in detail with reference to the exemplary drawings. In adding the reference numerals to the components of each drawing, it should be noted that the identical or equivalent component is designated by the identical numeral even when they are displayed on other drawings. Further, in describing the implementations of the present disclosure, a detailed description of the related known configuration or function may be omitted.

In describing the components of the implementations according to the present disclosure, terms such as first, second, A, B, (a), (b), and the like may be used. These terms are merely intended to distinguish the components from other components, and the terms do not limit the nature, order or sequence of the components.

Hereinafter, exemplary implementations of the present disclosure will be described in detail with reference to FIGS. 1 to 11.

Figure 2:
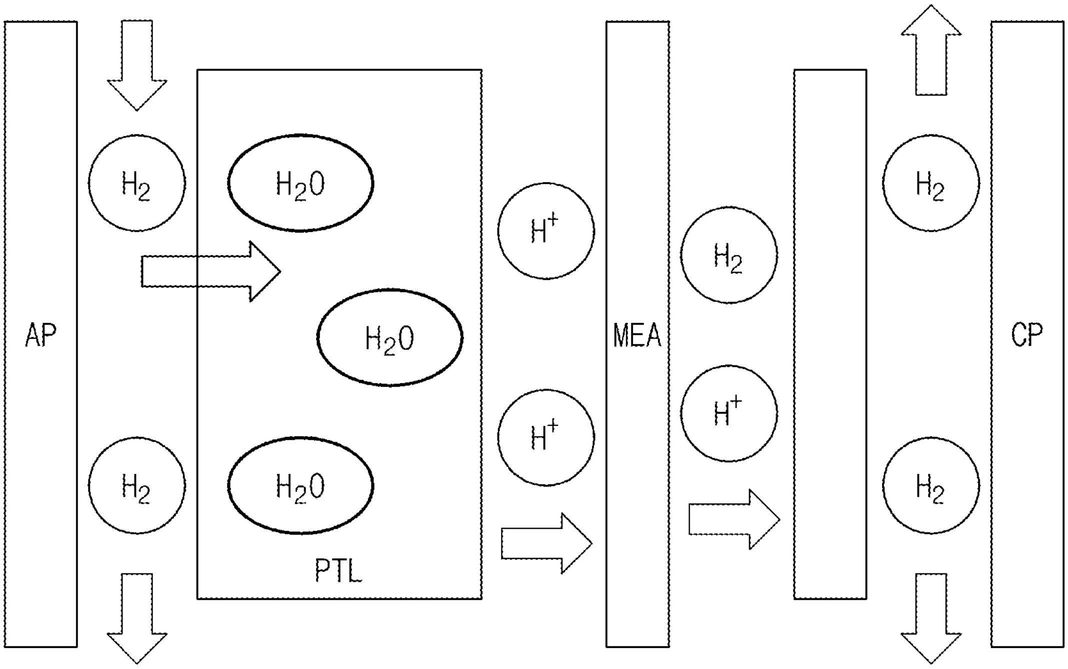
FIG. 2 is a view showing an example of a hydrogen compressor.

FIG. 1 is a view showing a hydrogen supply system according to an example of the present disclosure. FIG. 2 is a view showing an example of a hydrogen compressor.

Referring to FIGS. 1 and 2, a hydrogen supply system 100 according to an example of the present disclosure may include a hydrogen compressor 130, a power supply 140, a hydrogen tank 150, and a controller 160.

The hydrogen compressor 130 may be implemented as an electrochemical hydrogen compressor (EHC). As shown in FIG. 2, the electrochemical hydrogen compressor 130 may include a cell 131 composed of an anode separator AP, a metal diffusion layer PTL, a membrane electrode assembly MEA, and a cathode separator CP.

The anode separator AP may be disposed on an anode side of the membrane electrode assembly MEA to supply hydrogen to the anode of the membrane electrode assembly MEA.

The cathode separator CP may be disposed on a cathode side of the membrane electrode assembly MEA to discharge the hydrogen from the cathode of the membrane electrode assembly MEA.

The membrane electrode assembly MEA may include the anode, the cathode, and an electrolyte membrane for transferring the hydrogen introduced into the anode to the cathode.

The anode may receive the hydrogen, and the hydrogen molecules ($H_2$) supplied to the anode may be separated into hydrogen ions (2H+)+electrons (2e−) via an oxidation reaction. The hydrogen ions may move to the cathode via the electrolyte membrane, and the electrons may move to the cathode via the power supply. At the cathode, the hydrogen molecules may be generated via a reduction reaction of the hydrogen ions ($2H^+ + 2e^- \rightarrow H_2$).

The metal diffusion layer PTL may induce the hydrogen molecules provided to the side of the anode separator AP to be in contact with a surface of the membrane electrode assembly MEA in an evenly distributed manner. The metal diffusion layer PTL according to an example of the present disclosure may have a large hole size and a higher porosity compared to a metal diffusion layer according to a comparative example as in FIG. 3. Because the metal diffusion layer PTL according to implementations of the present disclosure has a larger hole size and a higher porosity compared to that according to the comparative example, a phenomenon of clogging of holes by moisture can be reduced.

The power supply 140 may apply a voltage to the cell 131 of the hydrogen compressor 130 under control of the controller 160. The power supply 140 may perform preliminary driving by applying a reference voltage to the anode separator AP and the cathode separator CP of the cell 131. In addition, the power supply 140 may apply a high voltage of a voltage level higher than that of the reference voltage to increase temperatures of the anode separator AP and the cathode separator CP. In some implementations, the moisture remaining inside the metal diffusion layer PTL located at the anode separator AP may be vaporized via the temperature increase of the anode separator AP and the cathode separator CP.

The hydrogen tank 150 may store the hydrogen generated by the hydrogen compressor 130, and the hydrogen stored in the hydrogen tank 150 may be provided to a fuel cell 200. The fuel cell 200 may generate electric energy via a chemical reaction between the hydrogen and oxygen.

The controller 160 may perform the preliminary driving of the hydrogen compressor 130, and may estimate an amount of hydrogen transferred via the membrane electrode assembly MEA interposed between the anode separator AP and the cathode separator CP in the cell 131 of the hydrogen compressor 130 in a preliminary driving period. In some implementations, the controller 160 may calculate a current density of the membrane electrode assembly MEA by applying the reference voltage to the cell 131 of the hydrogen compressor 130, and may estimate a magnitude of the transferred amount of hydrogen in proportion to the current density. In some implementations, the controller 160 may calculate the current density by calculating an output current amount of the power supply 140 for each unit area of the membrane electrode assembly MEA.

The controller 160 may perform initialization driving to reduce the moisture remaining around the anode separator AP of the cell 131, that is, inside the metal diffusion layer PTL based on that the transferred amount of hydrogen is smaller than a preset threshold value.

In some implementations, the controller 160 may control an additional apparatus for increasing the internal temperature of the hydrogen compressor for the initialization driving. For example, the controller 160 may control the power supply 140 to apply the high voltage higher than the reference voltage to the anode separator AP or the cathode separator CP. As such, the hydrogen supply system 100 according to an implementation of the present disclosure may vaporize the moisture remaining in the metal diffusion layer PTL using the high voltage applied to the electrode inside the cell 131. In particular, an implementation of the present disclosure may lower a relative humidity inside the cell 131 because the temperature of the electrode located inside the cell 131 is increased. When a scheme of applying heat generated from the outside of the cell 131 to the cell 131 is used, the relative humidity throughout the interior of the cell 131 increases and a pressure of the hydrogen provided to the metal diffusion layer PTL decreases, so that it can be difficult to expect the effect of removing moisture from the metal diffusion layer PTL. In contrast, an implementation of the present disclosure can effectively remove the moisture remaining in the metal diffusion layer PTL because the internal components of the cell 131 are heated.

A storage device 161 may store information such as an operation algorithm, an operation condition, and the like of the controller 160. The storage device 161 may be disposed in the controller 160 and may be a separate memory. Accordingly, the storage device 161 may be composed of a combination of a non-volatile memory such as a hard disk drive, a flash memory, an electrically erasable programmable read-only memory (EEPROM), a static RAM (SRAM), a ferro-electric RAM (FRAM), a phase-change RAM (PRAM), and a magnetic RAM (MRAM), and/or a volatile memory such as a dynamic random access memory (DRAM), a synchronous dynamic random access memory (SDRAM), and a double date rate-SDRAM (DDR-SDRAM).

Hereinafter, example methods for controlling the hydrogen supply system according to the present disclosure are provided.

Figure 3:
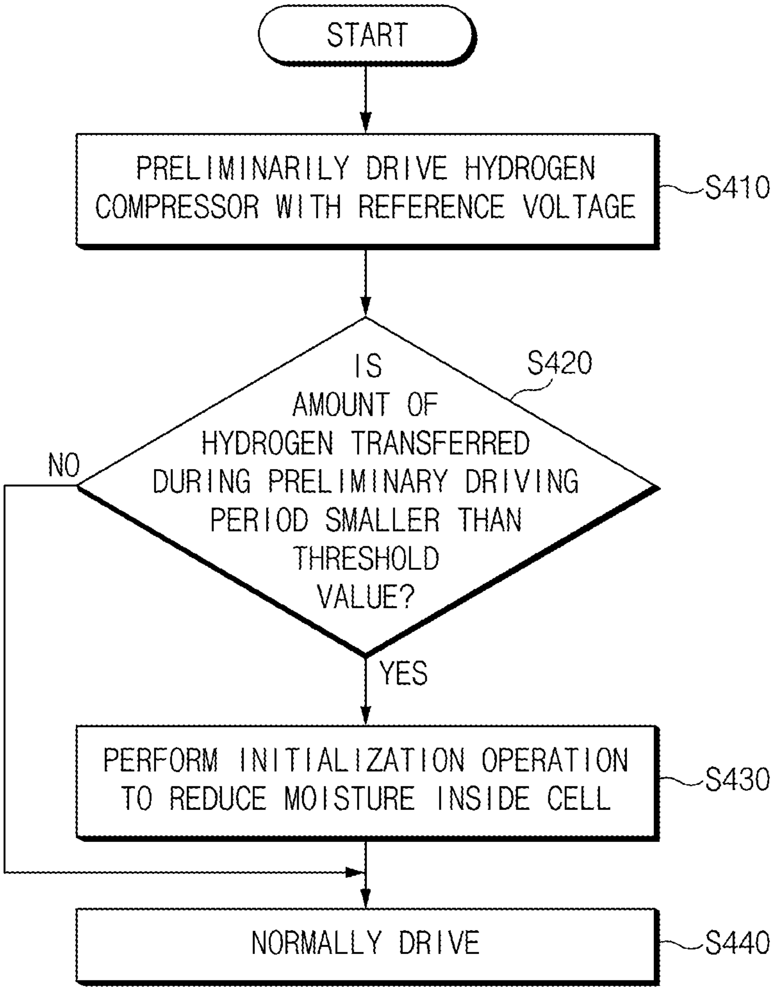
FIG. 3 is a flowchart showing a method for controlling a hydrogen supply system according to an example of the present disclosure.

FIG. 3 is a flowchart showing a method for controlling a hydrogen supply system according to an implementation of the present disclosure.

Referring to FIG. 3, an example method for controlling the hydrogen supply system can be as follows.

In S410, the hydrogen compressor 130 may be preliminarily driven using the reference voltage. For the preliminary driving of the hydrogen compressor 130, the controller 160 may control the power supply 140 to apply the reference voltage to the anode separator and the cathode separator CP of the cell 131. The reference voltage may be a voltage for driving the hydrogen compressor 130 during a normal driving period after the preliminary driving, and may be set in consideration of a resolution and an accuracy of the power supply 140. For example, when a voltage range for normally driving the hydrogen compressor 130 is a range from 0 V to 0.6 V, the reference voltage may be set to 0.2 V.

In S420, the controller 160 may determine whether the amount of hydrogen transferred during the preliminary driving period is smaller than the threshold value.

To this end, the controller 160 may determine the amount of hydrogen transferred via the membrane electrode assembly MEA in the cell.

The transferred amount of hydrogen may mean an amount of hydrogen transferred from the anode side to the cathode side via the membrane electrode assembly MEA. The amount of hydrogen transferred via the membrane electrode assembly MEA may be proportional to the current density of the membrane electrode assembly MEA by the voltage applied to the anode separator AP and the cathode separator CP. The current density of the membrane electrode assembly MEA may mean an amount of current for each unit area of the membrane electrode assembly MEA. An amount of current passing through the membrane electrode assembly MEA may be the same as an amount of current of the power supply 140 for applying the voltage to the anode separator AP and the cathode separator CP. Accordingly, the current density of the membrane electrode assembly MEA may be calculated as a value obtained by dividing the amount of current of the power supply 140 by an area of the membrane electrode assembly MEA.

The threshold value may be set within a range in which it is determined that the transferred amount of hydrogen is lower than a normal range because the holes of the metal diffusion layer PTL are severely clogged by water molecules.

The interior of the cell 131 of the hydrogen compressor 130 may contain the water molecules. The water molecules inside the cell 131 allow the hydrogen ions to be transferred from the anode to the cathode in the membrane electrode assembly MEA. However, when the water molecules inside the cell 131 clog the hole of the metal diffusion layer PTL, the transfer of the hydrogen ions to the membrane electrode assembly MEA may be interfered. The clogging of the hole of the metal diffusion layer PTL may become severe when the metal diffusion layer PTL is made of a metal material to withstand an internal high pressure of the hydrogen compressor 130. It can be difficult for the metal diffusion layer PTL made of the metal material to have a hydrophobic characteristic. Accordingly, the water molecules may be adsorbed on the surface of the metal diffusion layer PTL and inside the holes, and the holes may be clogged by the water molecules. When the holes are clogged by the water molecules, the hydrogen molecules provided to the anode side may leak to an outlet of the anode side without diffusing to the membrane electrode assembly MEA via the holes. Accordingly, the amount of hydrogen transferred to the cathode side via the membrane electrode assembly MEA can be reduced. That is, when the transferred amount of hydrogen is smaller than the threshold value, it may be estimated that the holes are clogged by the water molecules.

In S430, the controller 160 may proceed with an initialization operation of reducing the moisture inside the hydrogen compressor 130 based on that the transferred amount of hydrogen is smaller than the threshold value.

In some implementations, the initialization operation may include an operation of increasing the internal temperature of the hydrogen compressor.

The controller 160 may increase a temperature of the metal diffusion layer PTL by inducing the increase of the internal temperature of the hydrogen compressor 130. The controller 160 may increase the internal temperature of the hydrogen compressor 130 such that the temperature of the metal diffusion layer PTL increases to a level capable of vaporizing the water molecules.

In some implementations, the initialization operation may include an operation of providing dry hydrogen to the anode separator side.

In some implementations, the initialization operation may combine the operation of increasing the internal temperature of the hydrogen compressor 130 and the operation of providing the dry hydrogen to the anode separator AP side with each other.

S410 to S430 according to an implementation of the present disclosure may proceed before normally driving the cell 131 of the hydrogen compressor 130. In some implementations, the moisture clogging the holes of the metal diffusion layer PTL may be evaporated and removed by initializing the cell 131 using the procedure shown in FIG. 3. Therefore, the phenomenon in which the transferred amount of hydrogen is reduced can be lessened because the holes of the metal diffusion layer PTL are clogged by the moisture.

Figure 4:
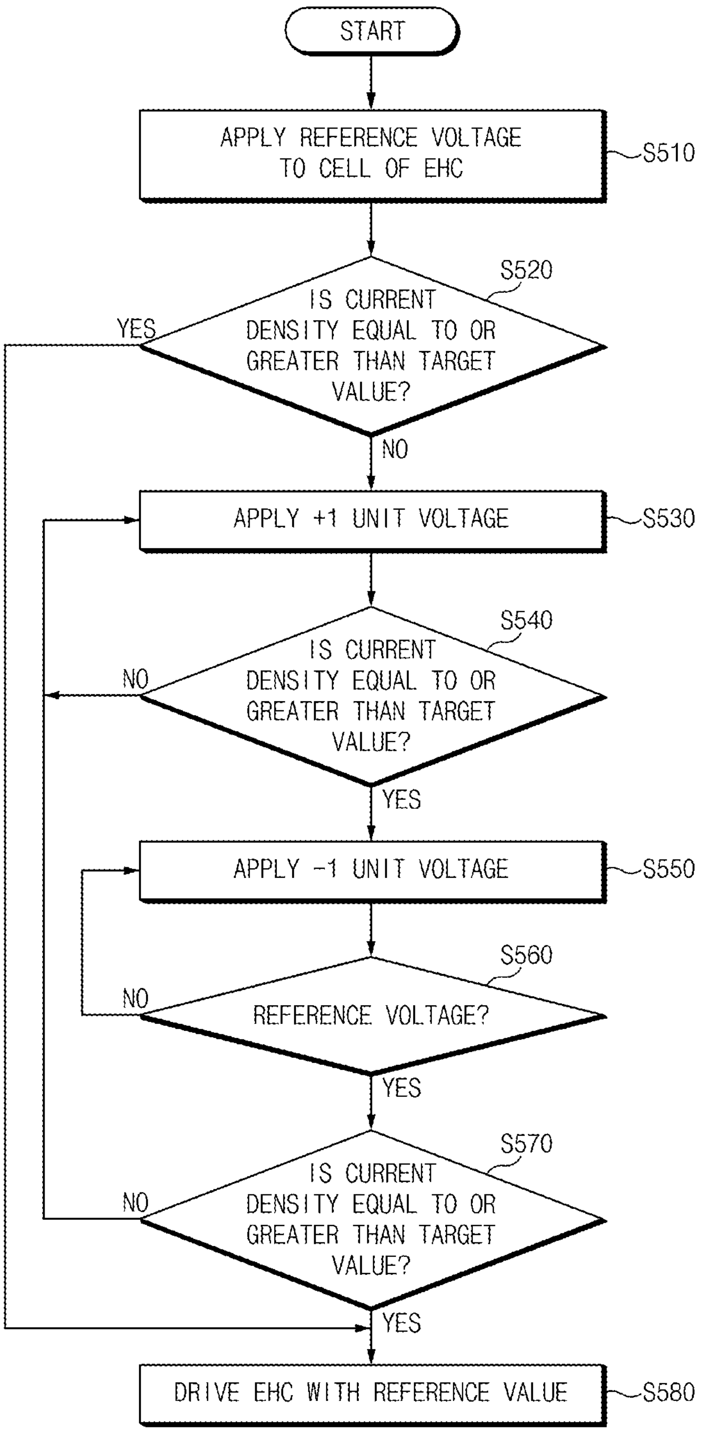
FIG. 4 is a flowchart showing a method for controlling a hydrogen supply system according to another example of the present disclosure.

FIG. 4 is a flowchart showing a method for controlling a hydrogen supply system according to an implementation of the present disclosure.

Referring to FIG. 4, an example method for controlling the hydrogen supply system can be as follows.

In S510, the controller 160 may apply the reference voltage to the cell of the hydrogen compressor 130. For example, the controller 160 may control the power supply 140 to apply the reference voltage to the cell of the hydrogen compressor 130. The reference voltage may be set within a voltage range capable of normally driving the hydrogen compressor 130 in a state in which the holes of the metal diffusion layer PTL of the hydrogen compressor 130 are not clogged. Even within the voltage range for driving the hydrogen compressor 130, the reference voltage may be set in consideration of the resolution and the accuracy of the power supply 140. For example, when the voltage range for normally driving the hydrogen compressor 130 is the range from 0 V To 0.6 V, the reference voltage may be set to 0.2 V.

In S520, the controller 160 may determine whether the current density of the membrane electrode assembly MEA is equal to or greater than a target value. The current density of the membrane electrode assembly MEA may correspond to that in the case of determining the amount of hydrogen transferred via the membrane electrode assembly MEA.

The current density of the membrane electrode assembly MEA may be calculated as the value obtained by dividing the amount of current of the power supply 140 by the area of the membrane electrode assembly MEA. That is, the controller 160 may identify the amount of current of the power supply 140 to calculate the current density of the membrane electrode assembly MEA. In addition, the controller 160 may identify the preset area of the membrane electrode assembly MEA.

The target value may be set to have a magnitude smaller than the current density in a normal range predicted when the reference voltage is applied to the hydrogen compressor 130. For example, a current density distribution in the normal range corresponding to the application of the reference voltage of 0.2 V to the hydrogen compressor 130 may be in a range from 0.5 $A/cm^2$ to 1 $A/cm^2$. Based on such experimental results, the target value may be set to 0.5 $A/cm^2$.

The controller 160 may monitor the current density for a predetermined time after applying the reference voltage to determine the magnitude of the current density. For example, the controller 160 may monitor the current density for 10 (s) and determine whether the target value is reached within 10 (s).

In S530 and S540, the controller 160 may calculate the current density by applying a voltage that is increased by +1 unit voltage to the hydrogen compressor 130 based on that the current density of the membrane electrode assembly MEA is smaller than the target value.

When the current density of the membrane electrode assembly MEA is smaller than the target value, it may be estimated that the holes of the metal diffusion layer PTL are clogged by the moisture. Accordingly, the controller 160 may vaporize the moisture by increasing the internal temperature of the cell 131 using the high voltage. A method of increasing the internal temperature of the cell 131 can be as follows with reference to FIG. 6.

Figure 5:
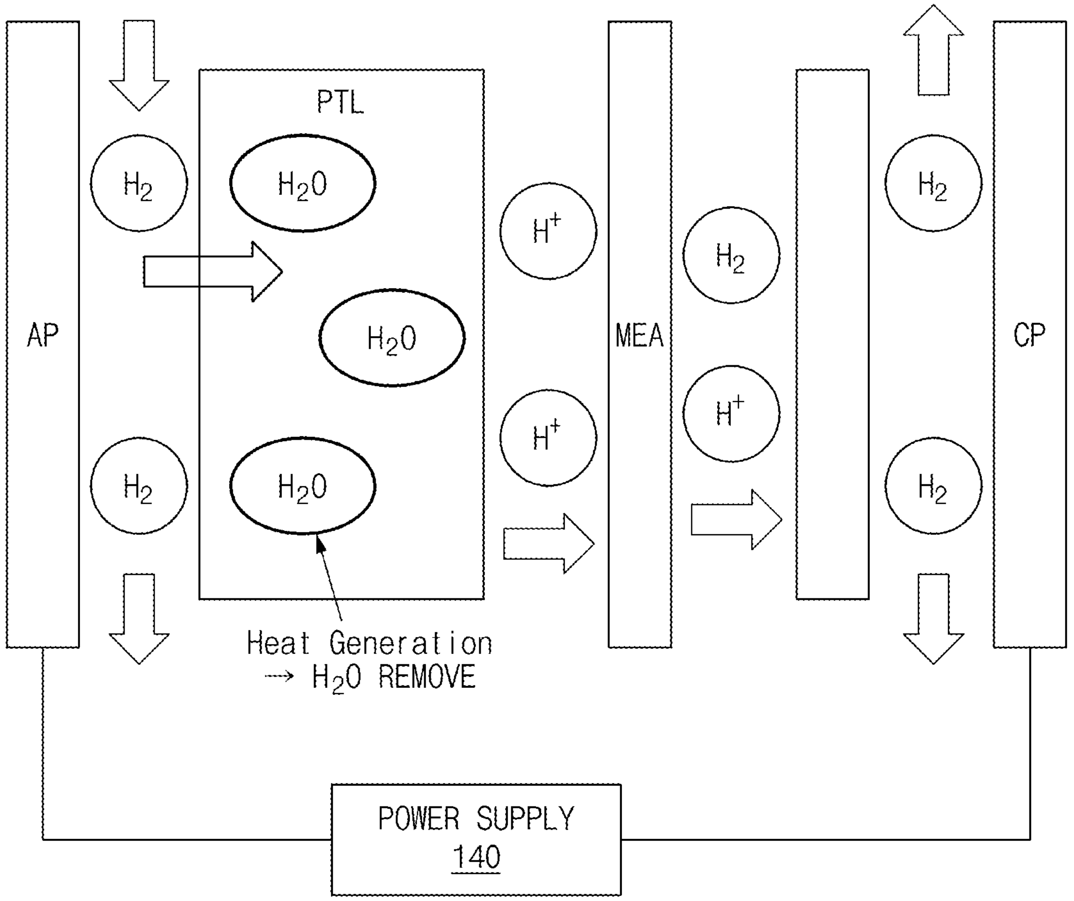
FIG. 5 is a view for illustrating a method for vaporizing moisture inside a cell using a high voltage.

FIG. 5 is a view for illustrating a method for vaporizing moisture inside a cell using a high voltage.

Referring to FIG. 5, the controller 160 may vaporize the moisture by applying the high voltage to the cathode separator CP of the cell 131.

The operation of applying the high voltage may include an operation of gradually increasing the reference voltage applied in the preliminary driving by +1 unit voltage. When the reference voltage is 0.2 V, the unit voltage may be set to 0.1 V. Therefore, when it is determined in S520 that the current density of the membrane electrode assembly MEA is smaller than the target value, the controller 160 may control the power supply 140 to apply a voltage of 0.3 V to the hydrogen compressor 130.

The controller 160 may determine whether the calculated current density is equal to or greater than the target value. The controller 160 may monitor the current density for the predetermined time after applying the voltage increased by +1 unit voltage to the hydrogen compressor 130 to determine the magnitude of the current density. For example, the controller 160 may monitor the current density for 10 (s) and determine whether the target value is reached within 10 (s).

When the current density is smaller than the target value in S530 and S540, the controller 160 may repeat the procedures of S530 and S540. That is, the controller 160 may drive the hydrogen compressor 130 while increasing the voltage applied to the cell of the hydrogen compressor 130 by +1 unit voltage. For example, when the reference voltage is 0.2 V and the unit voltage is 0.1 V, each time the procedures S530 and S540 are repeated, the controller 160 may increase the voltage applied to the hydrogen compressor 130 in an order of 0.3 V, 0.4 V, and 0.5 V.

In addition, while increasing the voltage applied to the cell 131 of the hydrogen compressor 130, the controller 160 may determine a target voltage that induces the current density of the membrane electrode assembly MEA corresponding to the target value. The target voltage may be set within a range that does not cause permanent deterioration in the cell. For example, the target voltage may be set in a range in which an oxide film is not formed on a platinum catalyst and carbon corrosion does not occur because of a high potential. The controller 160 may determine that the moisture in the metal diffusion layer PTL is removed by the target voltage, and thus the hydrogen compressor 130 is initialized to a state in which the hydrogen compressor 130 may operate normally.

When the current density reaches the target value, in S550, the controller 160 may apply a voltage corresponding to −1 unit voltage to the cell of the hydrogen compressor 130. For example, when the target voltage is 0.8 V, the controller 160 may apply a voltage of 0.7 V to the cell of the hydrogen compressor 130. When the moisture in the holes of the metal diffusion layer PTL vaporizes in S530, a flow path for the hydrogen molecules may be continuously secured by a flow of the hydrogen molecules. Therefore, in S550, the controller 160 may determine whether the current density of the hydrogen compressor 130 is in a normal state while lowering the voltage applied to the cell 131 to the reference voltage. To this end, the controller 160 may calculate the current density of the membrane electrode assembly MEA while lowering the voltage applied to the cell 131.

In S560 and S570, when the voltage applied to the cell 131 reaches the reference voltage, the controller 160 may monitor a change in the current density while maintaining the reference voltage for a predetermined time.

In S580, the controller 160 may drive the cell 131 of the hydrogen compressor 130 based on that the current density corresponding to the reference voltage is equal to or greater than the target value. For example, the controller 160 may drive the hydrogen compressor 130 by applying the reference voltage to the cell 131.

Figure 6:
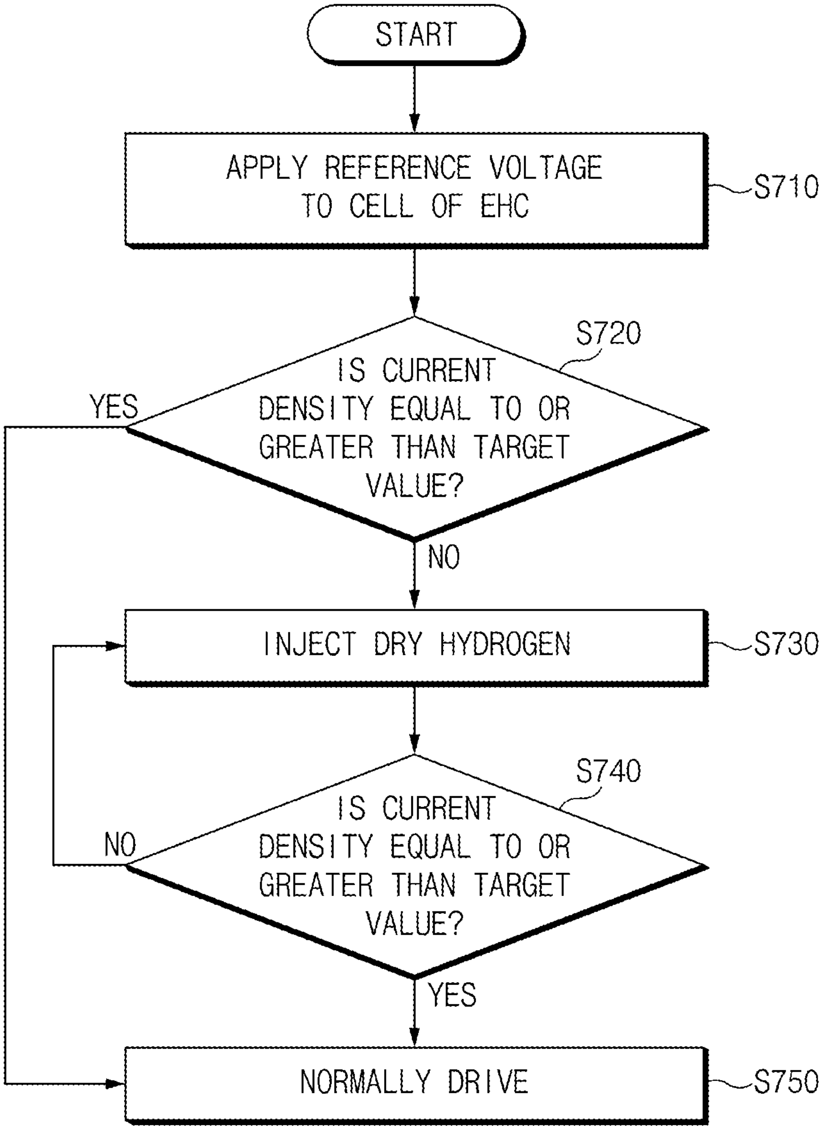
FIG. 6 is a flowchart showing a method for controlling a hydrogen supply system according to another example of the present disclosure.
Figure 7:
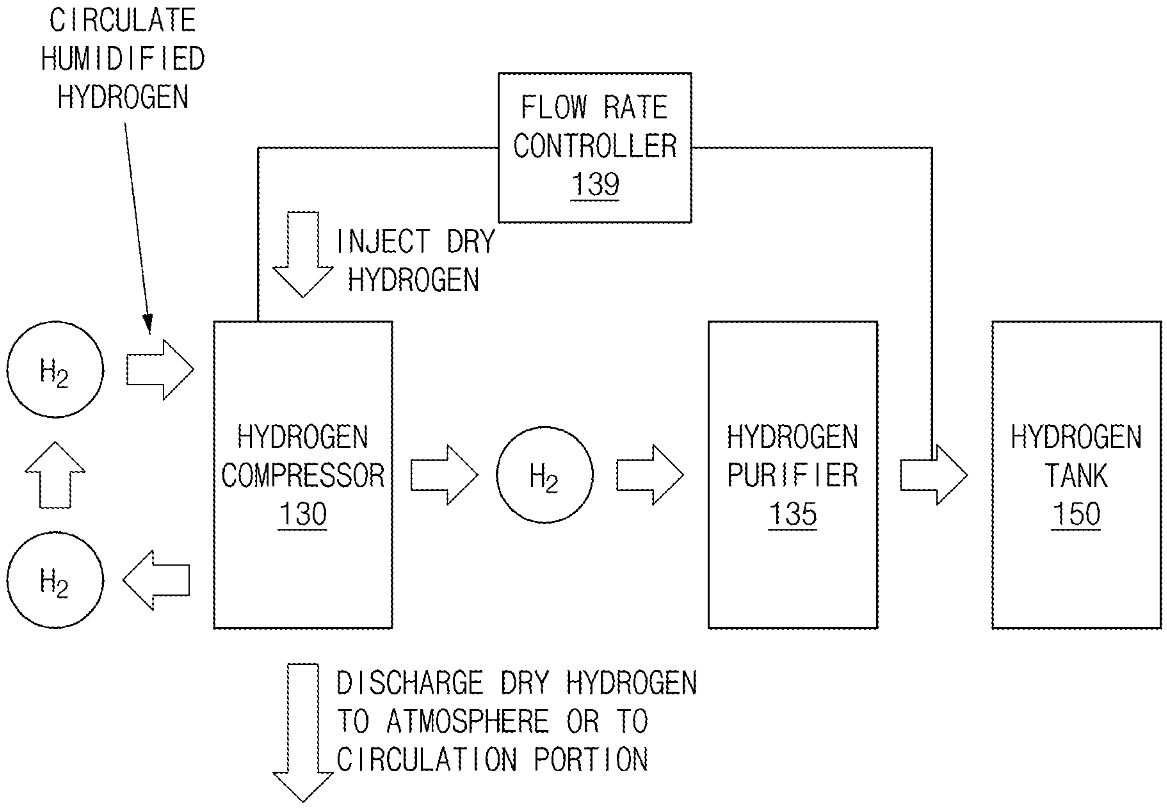
FIG. 7 is a view for illustrating an example method for supplying dry hydrogen.

FIG. 6 is a flowchart showing a method for controlling a hydrogen supply system according to an implementation of the present disclosure, and FIG. 7 is a view for illustrating an example method for supplying dry hydrogen.

Referring to FIGS. 6 and 7, an example method for controlling the hydrogen supply system can be as follows.

In S710, the controller 160 may apply the reference voltage to the cell of the hydrogen compressor 130. For example, the controller 160 may control the power supply 140 to apply the reference voltage to the cell of the hydrogen compressor 130. The reference voltage may be set within the voltage range capable of normally driving the hydrogen compressor 130 in the state in which the holes of the metal diffusion layer PTL of the hydrogen compressor 130 are not clogged. Even within the voltage range for driving the hydrogen compressor 130, the reference voltage may be set in consideration of the resolution and the accuracy of the power supply 140. For example, when the voltage range for normally driving the hydrogen compressor 130 is the range from 0 V to 0.6 V, the reference voltage may be set to 0.2 V.

In S720, the controller 160 may determine whether the current density of the membrane electrode assembly MEA is equal to or greater than the target value. The current density of the membrane electrode assembly MEA may correspond to the implementation of determining the amount of hydrogen transferred via the membrane electrode assembly MEA.

The current density of the membrane electrode assembly MEA may be calculated as the value obtained by dividing the amount of current of the power supply 140 by the area of the membrane electrode assembly MEA. That is, the controller 160 may identify the amount of current of the power supply 140 to calculate the current density of the membrane electrode assembly MEA. In addition, the controller 160 may identify the preset area of the membrane electrode assembly MEA.

The target value may be set to have the magnitude smaller than the current density in the normal range predicted when the reference voltage is applied to the hydrogen compressor 130. For example, the current density distribution in the normal range corresponding to the application of the reference voltage of 0.2 V to the hydrogen compressor 130 may be in the range from 0.5 A/cm$^2$ to 1 A/cm$^2$. Based on such experimental results, the target value may be set to 0.5 A/cm$^2$.

The controller 160 may monitor the current density for the predetermined time after applying the reference voltage to determine the magnitude of the current density. For example, the controller 160 may monitor the current density for 10 (s) and determine whether the target value is reached within 10 (s).

In S730, the controller 160 may control a flow rate controller 139 to supply the dry hydrogen discharged from a hydrogen purifier 135 to the hydrogen compressor 130 based on that the current density is smaller than the target value.

The hydrogen purifier 135 is for obtaining high-purity hydrogen, and has a relative humidity close to 0%. The flow rate controller 139 may provide the dry hydrogen generated by the hydrogen purifier 135 to the hydrogen compressor 130 under the control of the controller 160. The dry hydrogen provided to the anode separator AP of the cell 131 may absorb the moisture around the metal diffusion layer PTL.

After applying the dry hydrogen to the cell 131 of the hydrogen compressor 130, in S740, the controller 160 may calculate the current density of the membrane electrode assembly MEA, and determine whether the current density is equal to or greater than the target value. The current density calculation operation may include an operation of driving the hydrogen compressor 130 for a predetermined time in a state in which the dry hydrogen is injected.

The operation of driving the hydrogen compressor 130 may include an operation of injecting the water molecules into the hydrogen compressor 130. By injecting the water molecules into the hydrogen compressor 130, the hydrogen injected into the anode may be humidified to close to 100% of the RH. An electrolyte membrane structure of the membrane electrode assembly MEA requires the water molecules to facilitate the transfer of the hydrogen ions, so that the operation of injecting the water molecules may be included to produce humidified hydrogen.

The humidified hydrogen may be discharged from the hydrogen compressor 130, and the discharged humidified hydrogen may be recycled again into the hydrogen compressor 130.

In addition, the dry hydrogen injected into the hydrogen compressor 130 may be discharged to atmosphere or discharged to a circulation portion after removing the moisture of the metal diffusion layer PTL. The outlet of the anode may be sufficiently pressurized to an internal pressure limit that the metal diffusion layer PTL applied to the cathode may withstand for the dry hydrogen to be discharged after being sufficiently accumulated in the cell.

The controller 160 may calculate the current density after driving the hydrogen compressor 130 for the predetermined time, and repeat the procedure of injecting the dry hydrogen in S730 when the calculated current density is smaller than the target value. The controller 160 may calculate the current density after driving the hydrogen compressor 130 for the predetermined time, and may perform the normal operation in S750 when the calculated current density is equal to or greater than the target value.

Figure 8:
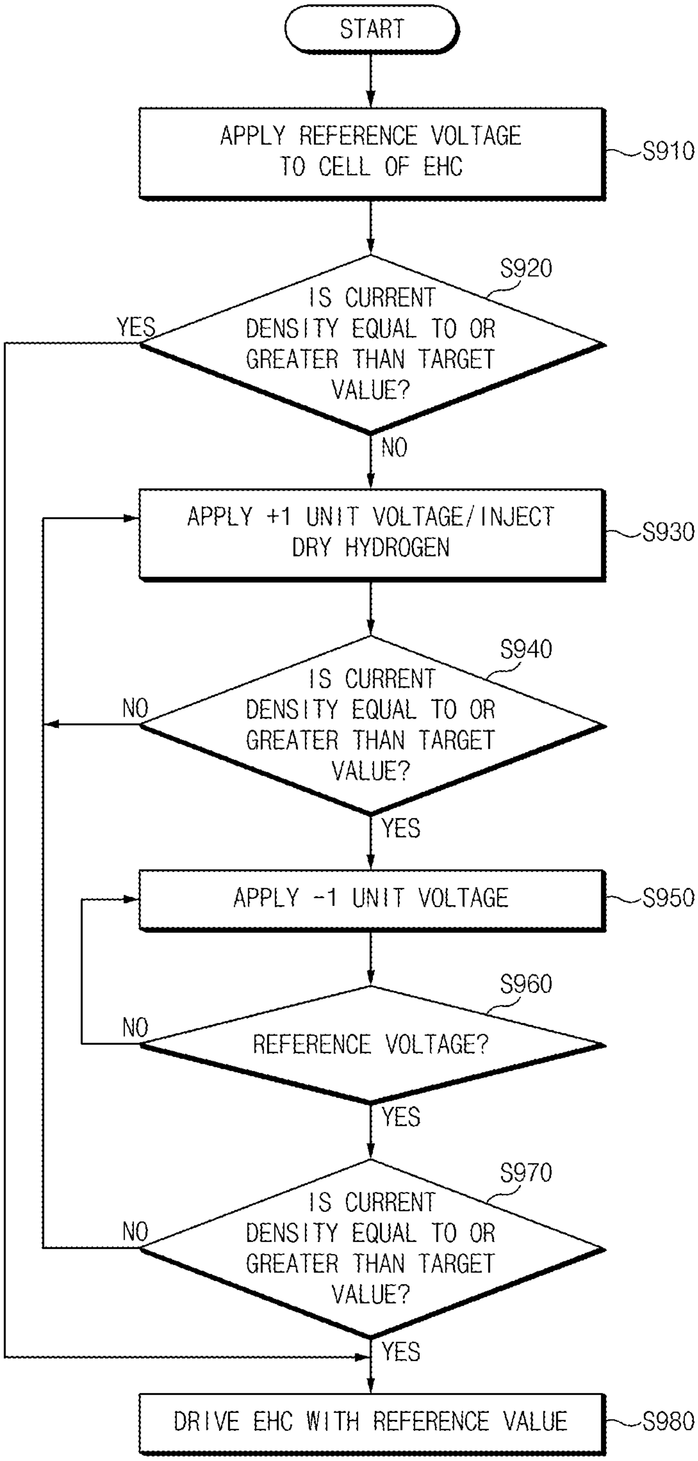
FIG. 8 is a flowchart showing a method for controlling a hydrogen supply system according to an example of the present disclosure.

FIG. 8 is a flowchart showing a method for controlling a hydrogen supply system according to an implementation of the present disclosure.

Referring to FIG. 8, an example method for controlling the hydrogen supply system can be as follows.

In S910, the controller 160 may apply the reference voltage to the cell of the hydrogen compressor 130. For example, the controller 160 may control the power supply 140 to apply the reference voltage to the cell of the hydrogen compressor 130. The reference voltage may be set within the voltage range capable of normally driving the hydrogen compressor 130 in the state in which the holes of the metal diffusion layer PTL of the hydrogen compressor 130 are not clogged. Even within the voltage range for driving the hydrogen compressor 130, the reference voltage may be set in consideration of the resolution and the accuracy of the power supply 140. For example, when the voltage range for normally driving the hydrogen compressor 130 is the range from 0 V to 0.6 V, the reference voltage may be set to 0.2 V.

In S920, the controller 160 may determine whether the current density of the membrane electrode assembly MEA is equal to or greater than the target value. The current density of the membrane electrode assembly MEA may correspond to the implementation of determining the amount of hydrogen transferred via the membrane electrode assembly MEA.

The current density of the membrane electrode assembly MEA may be calculated as the value obtained by dividing the amount of current of the power supply 140 by the area of the membrane electrode assembly MEA. That is, the controller 160 may identify the amount of current of the power supply 140 to calculate the current density of the membrane electrode assembly MEA. In addition, the controller 160 may identify the preset area of the membrane electrode assembly MEA.

The target value may be set to have the magnitude smaller than the current density in the normal range predicted when the reference voltage is applied to the hydrogen compressor 130. For example, the current density distribution in the normal range corresponding to the application of the reference voltage of 0.2 V to the hydrogen compressor 130 may be in the range from 0.5 $A/cm^2$ to 1 $A/cm^2$. Based on such experimental results, the target value may be set to 0.5 $A/cm^2$.

The controller 160 may monitor the current density for the predetermined time after applying the reference voltage to determine the magnitude of the current density. For example, the controller 160 may monitor the current density for 10 (s) and determine whether the target value is reached within 10 (s).

In S930, the controller 160 may apply the voltage that is increased by +1 unit voltage to the hydrogen compressor 130 based on that the current density of the membrane electrode assembly MEA is smaller than the target value. In addition, the controller 160 may provide the dry hydrogen to the hydrogen compressor 130 at the same time as applying the high voltage.

When the current density of the membrane electrode assembly MEA is smaller than the target value, it may be estimated that the holes of the metal diffusion layer PTL are clogged by the moisture. Accordingly, the controller 160 may vaporize the moisture by increasing the internal temperature of the cell 131 using the high voltage. In addition, the controller 160 may remove the moisture in the metal diffusion layer PTL by providing the dry hydrogen to the cell 131.

In S940, the controller 160 may calculate the current density of the membrane electrode assembly MEA, and determine whether the calculated current density is equal to or greater than the target value. The operation of calculating the current density in S940 may include the operation of monitoring the current density for the predetermined time. For example, the controller 160 may monitor the current density for 10 (s) after S930, and determine whether the current density reaches the target value within 10 (s).

When the current density is smaller than the target value in S930 and S940, the controller 160 may repeat the procedures of S930 and S940. That is, the controller 160 may drive the hydrogen compressor 130 while increasing the voltage applied to the cell of the hydrogen compressor 130 by +1 unit voltage. For example, when the reference voltage is 0.2 V and the unit voltage is 0.1 V, each time the procedures S930 and S940 are repeated, the controller 160 may increase the voltage applied to the hydrogen compressor 130 in the order of 0.3 V, 0.4 V, and 0.5 V. In addition, the controller 160 may re-inject the dry hydrogen into the cell 131 of the hydrogen compressor 130 whenever the procedures of S930 and S940 are repeated.

In addition, while repeating the operations of S930 and S940, the controller 160 may determine the target voltage inducing the current density of the membrane electrode assembly MEA corresponding to the target value.

When the current density reaches the target value, in S950, the controller 160 may apply the voltage corresponding to −1 unit voltage to the cell of the hydrogen compressor 130. For example, when the target voltage is 0.8 V, the controller 160 may apply the voltage of 0.7 V to the cell of the hydrogen compressor 130.

The controller 160 may calculate the current density of the membrane electrode assembly MEA while lowering the voltage applied to the cell 131.

In S960 and S970, when the voltage applied to the cell 131 reaches the reference voltage, the controller 160 may monitor the change in current density while maintaining the reference voltage for the predetermined time.

In S980, the controller 160 may drive the cell 131 of the hydrogen compressor 130 based on that the current density corresponding to the reference voltage is equal to or greater than the target value. For example, the controller 160 may drive the hydrogen compressor 130 by applying the reference voltage to the cell 131.

Figure 9:
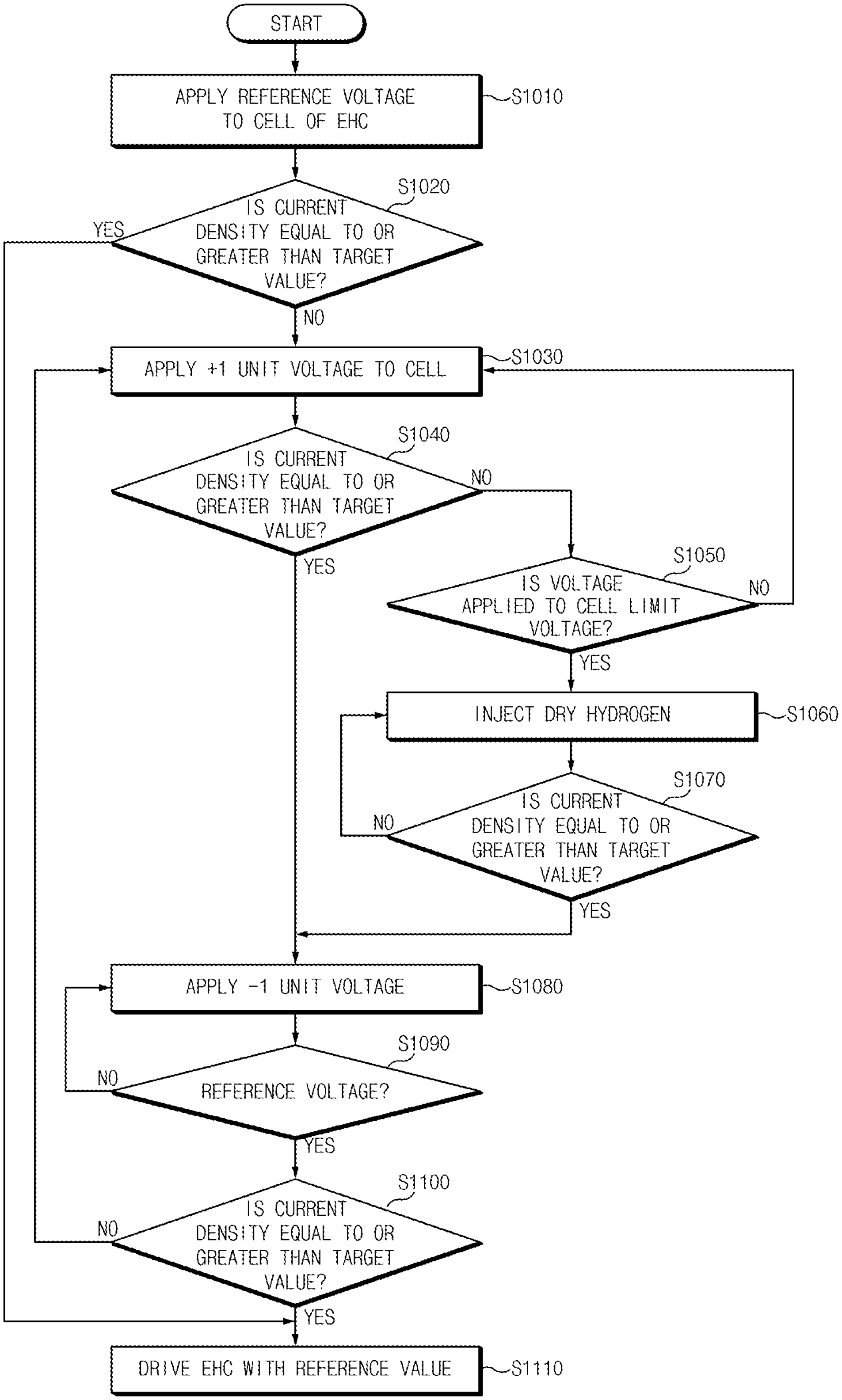
FIG. 9 is a flowchart showing a method for controlling a hydrogen supply system according to an example of the present disclosure.

FIG. 9 is a flowchart showing a method for controlling a hydrogen supply system according to an implementation of the present disclosure.

Referring to FIG. 9, an example method for controlling the hydrogen supply system can be as follows.

In S1010, the controller 160 may apply the reference voltage to the cell of the hydrogen compressor 130. For example, the controller 160 may control the power supply 140 to apply the reference voltage to the cell of the hydrogen compressor 130. The reference voltage may be set within the voltage range capable of normally driving the hydrogen compressor 130 in the state in which the holes of the metal diffusion layer PTL of the hydrogen compressor 130 are not clogged. Even within the voltage range for driving the hydrogen compressor 130, the reference voltage may be set in consideration of the resolution and the accuracy of the power supply 140. For example, when the voltage range for normally driving the hydrogen compressor 130 is the range from 0 V to 0.6 V, the reference voltage may be set to 0.2 V.

In S1020, the controller 160 may determine whether the current density of the membrane electrode assembly MEA is equal to or greater than the target value. The current density of the membrane electrode assembly MEA may correspond to the implementation of determining the amount of hydrogen transferred via the membrane electrode assembly MEA.

The current density of the membrane electrode assembly MEA may be calculated as the value obtained by dividing the amount of current of the power supply 140 by the area of the membrane electrode assembly MEA. That is, the controller 160 may identify the amount of current of the power supply 140 to calculate the current density of the membrane electrode assembly MEA. In addition, the controller 160 may identify the preset area of the membrane electrode assembly MEA.

The target value may be set to have the magnitude smaller than the current density in the normal range predicted when the reference voltage is applied to the hydrogen compressor 130. For example, the current density distribution in the normal range corresponding to the application of the reference voltage of 0.2 V to the hydrogen compressor 130 may be in the range from 0.5 $A/cm^2$ to 1 $A/cm^2$. Based on such experimental results, the target value may be set to 0.5 $A/cm^2$.

The controller 160 may monitor the current density for the predetermined time after applying the reference voltage to determine the magnitude of the current density. For example, the controller 160 may monitor the current density for 10 (s) and determine whether the target value is reached within 10 (s).

In S1030, the controller 160 may apply the voltage that is increased by +1 unit voltage to the hydrogen compressor 130 based on that the current density of the membrane electrode assembly MEA is smaller than the target value. When the current density of the membrane electrode assembly MEA is smaller than the target value, it may be estimated that the holes of the metal diffusion layer PTL are clogged by the moisture. Accordingly, the controller 160 may vaporize the moisture by increasing the internal temperature of the cell 131 using the high voltage.

In S1040, the controller 160 may calculate the current density of the membrane electrode assembly MEA, and determine whether the calculated current density is equal to or greater than the target value. The operation of calculating the current density in S1040 may include the operation of monitoring the current density for the predetermined time. For example, the controller 160 may monitor the current density for 10 (s) after S1030, and determine whether the current density reaches the target value within 10 (s).

When the current density is smaller than the target value in S1040, the controller 160 may determine whether the voltage applied to the cell is a limit voltage in S1050. The limit voltage may be set to a voltage value that may cause deterioration of internal components of the cell 131. For example, when the internal temperature of the cell 131 becomes a temperature equal to or higher than an arbitrary high temperature, certain components located inside the cell 131 may be corroded or deformed by the deterioration. As such, the temperature at which the deterioration may be induced may be preset to prevent the deterioration of the components included in the cell 131. In addition, the limit voltage may be preset such that the internal temperature of the cell 131 does not increase to a level capable of inducing the deterioration.

When the controller 160 determines that the voltage applied to the cell 131 in S1030 has not reached the preset limit voltage in S1050, the controller 160 may perform the control to repeat S1030.

The controller 160 may determine whether the voltage applied to the cell 131 in S1030 is the preset limit voltage in S1050, and inject the dry hydrogen into the cell 131 based on that the voltage applied to the cell 131 is the limit voltage in S1060. The moisture clogging the holes in the metal diffusion layer PTL may be removed by injecting the dry hydrogen into the cell 131.

After applying the dry hydrogen to the cell 131 of the hydrogen compressor 130, in S1070, the controller 160 may calculate the current density of the membrane electrode assembly MEA, and determine whether the current density is equal to or greater than the target value. The operation of calculating the current density may include the operation of driving the hydrogen compressor 130 for the predetermined time in the state in which the dry hydrogen is injected.

The controller 160 may calculate the current density after driving the hydrogen compressor 130 for the predetermined time, and may repeat the procedure of injecting the dry hydrogen in S1060 when the calculated current density is smaller than the target value.

When the current density reaches the target value, in S1080, the controller 160 may apply the voltage corresponding to −1 unit voltage to the cell of the hydrogen compressor 130. For example, when the target voltage is 0.8 V, the controller 160 may apply the voltage of 0.7 V to the cell of the hydrogen compressor 130.

The controller 160 may calculate the current density of the membrane electrode assembly MEA while lowering the voltage applied to the cell 131.

In S1090 and S1100, when the voltage applied to the cell 131 reaches the reference voltage, the controller 160 may monitor the change in the current density while maintaining the reference voltage for the predetermined time.

In S1110, the controller 160 may drive the cell 131 of the hydrogen compressor 130 based on that the current density corresponding to the reference voltage is equal to or greater than the target value. For example, the controller 160 may drive the hydrogen compressor 130 by applying the reference voltage to the cell 131.

According to implementation shown in FIG. 9, before normally driving the hydrogen compressor 130, the moisture clogging the holes of the metal diffusion layer PTL may be primarily removed by applying the high voltage to the cell 131.

When the moisture is not sufficiently removed by the operation of primarily vaporizing the moisture inside the cell 131, the dry hydrogen may be secondarily injected to remove the moisture inside the cell 131. In particular, in this case, in the operation of primarily vaporizing the moisture in the cell 131 using the high voltage, application of the high voltage equal to or higher than the limit voltage may be prevented. Accordingly, an occurrence of problems resulted from the deterioration of the internal components of the cell 131 caused by excessive increase of the internal temperature of the cell 131 may be prevented.

Thus, the operations of the method or the algorithm described in connection with the implementations and examples disclosed herein may be embodied directly in hardware or a software module executed by a processor, or in a combination thereof. The software module may reside on a storage medium (that is, a memory and/or storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the implementations disclosed in the present disclosure are not intended to limit the technical idea of the present disclosure but to illustrate the present disclosure, and the scope of the technical idea of the present disclosure is not limited by the implementations. The scope of the present disclosure should be construed as being covered by the scope of the appended claims, and all technical ideas falling within the scope of the claims should be construed as being included in the scope of the present disclosure.

According to an implementation of the present disclosure, the hydrogen compressor may be driven normally by removing the moisture remaining in the cell of the hydrogen compressor via the initialization driving before driving the hydrogen compressor.

In addition, according to an implementation of the present disclosure, the moisture may be effectively removed by lowering the relative humidity by removing the moisture via the heating of the electrode inside the cell of the hydrogen compressor.

In addition, according to an implementation of the present disclosure, the moisture of the cell may be removed while preventing the damage and the deformation of the internal components of the cell by preventing the deterioration caused by the high temperature inside the cell.

In addition, various effects directly or indirectly identified through the present document may be provided.

Hereinabove, although the present disclosure has been described with reference to exemplary implementations and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for supplying hydrogen, the system comprising:

a hydrogen compressor configured to electrochemically compress the hydrogen, the hydrogen compressor having a cell that includes an anode separator, a cathode separator, and a membrane electrode assembly interposed between the anode separator and the cathode separator; and a controller configured to:

preliminarily drive the hydrogen compressor during a preliminary driving period, estimate an amount of hydrogen transferred via the membrane electrode assembly during the preliminary driving period, and based on the transferred amount of hydrogen being less than a threshold value, perform initialization driving to thereby reduce moisture on a side of the anode separator of the cell.

2. The system of claim 1, further comprising:

a power supply that is controlled by the controller and configured to apply a reference voltage to the anode separator and the cathode separator of the cell during the preliminary driving period.

3. The system of claim 2, wherein the controller is configured to:

calculate a current density of the membrane electrode assembly by applying the reference voltage to the cell of the hydrogen compressor; and estimate a magnitude of the transferred amount of hydrogen in proportion to the current density.

4. The system of claim 3, wherein the controller is configured to drive the hydrogen compressor with the reference voltage after the preliminary driving.

5. The system of claim 1, wherein the controller is configured to increase a temperature inside the hydrogen compressor.

6. The system of claim 5, wherein the controller is configured to control a power supply to apply a high voltage higher than a reference voltage to the anode separator or the cathode separator.

7. The system of claim 6, wherein the controller is configured to:

apply increasing voltage levels to the anode separator and the cathode separator;

calculate a current density at each voltage level among the increasing voltage levels; and confirm a target voltage of inducing the current density to reach a preset target value.

8. The system of claim 7, wherein the controller is configured to:

drive the cell while lowering the target voltage to a magnitude of the reference voltage; and perform the initialization driving until the current density obtained in a reference voltage-applied period becomes equal to or greater than the preset target value.

9. The system of claim 1, further comprising a hydrogen purifier configured to purify hydrogen discharged from the hydrogen compressor, wherein the controller is configured to control a flow path of the hydrogen purifier to provide hydrogen discharged from the hydrogen purifier to the hydrogen compressor.

10. The system of claim 9, wherein the controller is configured to:

increase a temperature in the cell by increasing a voltage level from a preset reference voltage of the anode separator or the cathode separator to a preset limit voltage; and provide dry hydrogen discharged from the hydrogen purifier to the side of the anode separator based on a current density at a threshold voltage being less than the threshold value.

11. A method for controlling a hydrogen supply system, the method comprising:

preliminarily driving a hydrogen compressor using a reference voltage during a preliminary driving period;

estimating an amount of hydrogen transferred via a membrane electrode assembly in a cell of the hydrogen compressor during the preliminary driving period; and performing initialization driving to reduce moisture on a side of an anode separator of the cell based on the transferred amount of hydrogen being less than a threshold value.

12. The method of claim 11, wherein the preliminary driving of the hydrogen compressor includes:

applying the reference voltage to the anode separator and a cathode separator of the cell using a power supply.

13. The method of claim 12, wherein the estimating of the transferred amount of hydrogen includes:

applying the reference voltage to the cell of the hydrogen compressor;

calculating a current density of the membrane electrode assembly; and estimating a magnitude of the transferred amount of hydrogen in proportion to the current density.

14. The method of claim 13, further comprising:

driving the hydrogen compressor using the reference voltage after the preliminary driving.

15. The method of claim 11, wherein the performing of the initialization driving includes:

increasing a temperature inside the hydrogen compressor.

16. The method of claim 15, wherein the performing of the initialization driving includes:

applying a high voltage higher than the reference voltage to the anode separator or a cathode separator using a power supply.

17. The method of claim 16, wherein the performing of the initialization driving includes:

applying increasing voltage levels to the anode separator and the cathode separator;

calculating a current density at each voltage level among the increasing voltage levels; and confirming a target voltage of inducing the current density to reach a preset target value.

18. The method of claim 17, wherein the performing of the initialization driving includes:

driving the cell while lowering the target voltage to a magnitude of the reference voltage; and performing the initialization driving until the current density obtained in a reference voltage-applied period becomes equal to or greater than the preset target value.

19. The method of claim 11, wherein the performing of the initialization driving includes:

providing dry hydrogen to a side of the anode separator.

20. The method of claim 19, wherein the performing of the initialization driving includes:

increasing a temperature in the cell by increasing a voltage level from a preset reference voltage of the anode separator or a cathode separator to a preset limit voltage; and providing dry hydrogen to the side of the anode separator when a current density at the preset limit voltage is less than the threshold value.

* * * * *